(12) United States Patent
Kobilka et al.

(10) Patent No.: US 10,166,520 B2
(45) Date of Patent: Jan. 1, 2019

(54) CATCAPSULES FOR SELF-HEALING APPLICATIONS

(71) Applicant: International Business Machines Corporation, Armonk, NY (US)

(72) Inventors: Brandon M. Kobilka, Tucson, AZ (US); Joseph Kuczynski, North Port, FL (US); Jacob T. Porter, Highland, NY (US); Jason T. Wertz, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/473,102

(22) Filed: Mar. 29, 2017

(65) Prior Publication Data

US 2018/0280913 A1 Oct. 4, 2018

(51) Int. Cl.
*B01J 13/20* (2006.01)

(52) U.S. Cl.
CPC ......... *B01J 13/20* (2013.01); *B32B 2307/762* (2013.01)

(58) Field of Classification Search
None
See application file for complete search history.

(56) References Cited

U.S. PATENT DOCUMENTS

| | | | | |
|---|---|---|---|---|
| 2013/0324639 A1* | 12/2013 | Boday | ................... | B29C 73/22 523/202 |
| 2015/0018485 A1* | 1/2015 | Wilson | ................... | C08L 71/02 524/755 |
| 2016/0096956 A1* | 4/2016 | Boday | ................... | C08L 65/00 525/112 |

FOREIGN PATENT DOCUMENTS

| | | | | |
|---|---|---|---|---|
| WO | | 2015171429 A1 | 11/2015 | |
| WO | WO-2015171429 A1 | * | 11/2015 | .............. B01J 13/14 |

OTHER PUBLICATIONS

TC Mauldin. "Self-healing polymers—the importance of choosing an adequate healing monomer, and the olefin metathesis polymerization of agricultural oils." PhD Thesis, Iowa State University, 2011, pp. i-viii and 1-187. (Year: 2011).*
J Suriboot, HS Bazzi DE Bergbreiter. "Supported Catalysts Useful in Ring-Closing Metathesis, Cross Metathesis, and Ring-Opening Metathesis Polymerization." Polymers, vol. 8 (140), 2016, pp. 1-23. Published Apr. 12, 2016. (Year: 2016).*
Johannes Fickert et al.,Efficient Encapsulation of Self-Healing Agents in Polymer Nanocontainers Functionalized by Orthogonal Reactions, Macromolecules, 2012, vol. 45, Iss.16, pp. 6324-6332.
Johannes Fickert, Nanocapsules for Self-Healing Materials, Doctoral Thesis, Johannes Gutenberg-Universität Mainz (2013).
Daryl P. Allen et al., Well-Defined Silica-Supported Olefin Metathesis Catalysts, 2009, vol. 11, No. 6, pp. 1261-1264.
J. T. Wertz et al. Polylactic Acid with Improved Heat Deflection Temperatures and Self-Healing Properties for Durable Goods Applications, ACS Applied Materials & Interfaces, 2014, vol. 6, Iss. 21, pp. 18511-18516.
E. N. Brown et al., In situ poly(urea-formaldehyde) microencapsulation of dicyclopentadiene, 2003, vol. 20, No. 6, pp. 719-730.
Stober et al., Journal of Colloid & Interface Sciences, 1968, vol. 26, Iss. 1, pp. 62-69.
J. Lim et al., Supporting Information for Mesoporous Silica-Supported Catalysts for Metathesis: Application to a Circulating Flow Reactor, Chemical Communications, 2010, vol. 46, pp. 806-808.
F. Blanc et al., Surface Versus Molecular Siloxy Ligands in Well-Defined Olefin Metathesis Catalysts: [{(RO)3SiO}Mo(=NAr)(=CHtBu)(CH2tBu)], Angewandte Chemie International Edition 2006, vol. 45, pp. 1216-1220.
A. Monge-Marcet et al., Catalytic applications of recyclable silica immobilized NHC-ruthenium complexes, Tetrahedron, 2013, vol. 69, Iss. 1, pp. 341-348.
F. Blanc et al., Supporting Information for Highly Active, Stable, and Selective Well-Defined Silica Supported Mo Imido Olefin Metathesis Catalysts, Journal of the American Chemical Society 2007, vol. 129, Iss. 5, pp. 1044-1045.
B. Rhers et al., Supporting Information for a Well-Defined, Silica-Supported Tungsten Imido Alkylidene Olefin Metathesis Catalyst, Organometallics, 2006, vol. 25, Iss. 15, pp. 3554-3557.
F. Blanc et. al., Supporting Information for Dramatic Enhancement of the Alkene Metathesis Activity of Mo Imido Alkylidene Complexes Ipon Replacement of One tBuO by a Surface Siloxy Ligand, Dalton Transactions 2008, pp. 3156-3158.
T. Haque et al., Acyclic Diene Metathesis (ADMET) Polymerization for Precise Synthesis of Defect-Free Conjugated Polymers with Well-Defined Chain Ends, Catalysts 2015, vol. 5, pp. 500-517.

* cited by examiner

*Primary Examiner* — Isaac Shomer
(74) *Attorney, Agent, or Firm* — Patterson + Sheridan, LLP (57) ABSTRACT

Materials and methods for preparing payload-containing microcapsules with walls that have orthogonal functionality are described. In some embodiments, the microcapsule comprises a material having a polymer matrix filled with a self-healing agent, and the microcapsule is modified with a catalyst and an orthogonally-bound silica support.

20 Claims, 6 Drawing Sheets

FIG. 5

CATCAPSULES FOR SELF-HEALING APPLICATIONS

FIELD OF THE DISCLOSURE

Materials and methods described herein relate to self-healing materials.

BACKGROUND

Cracking in polymeric materials, such as thermosetting polymers, can be highly problematic as it leads to the degradation and failure of devices. These cracks occur not only on the surface of the devices, but can also occur on the inside, which are not usually detected by visual inspection. Cracking can cause fiber-matrix interfacial debonding, ply delamination, and simple matrix delamination, which then can lead to degradation and more often than not, complete failure. These cracks can form from thermal and mechanical stresses during the use of the polymeric material. In circuit boards, for example, these cracks can lead to electrical component failure.

In conventional self-healing applications that utilize microcapsules, a catalyst is either blended into the resin along with the microcapsules, or is encapsulated as well, and then blended with the resin-containing microcapsules into a polymeric resin. In these two examples, the crack must be sufficient to expose both the catalyst and the resin (e.g., cracking both a resin-containing capsule and a catalyst-containing capsule). Additionally, in conventional applications, when the catalyst is directly against the microcapsule, the chances of the self-healing agent being released becomes reduced because the catalyst reacts too close to the self-healing agent and essentially closes the capsule, thereby limiting flow into the cracks that have propagated through the polymer.

SUMMARY

Embodiments described herein relate to materials and methods of making microcapsules that have an encapsulated payload(s).

According to one embodiment, a method of making a microcapsule is provided. The method includes forming a first microcapsule having a payload agent inside the microcapsule and an orthogonal-functionalized unit incorporated into the wall of the microcapsule; and reacting the first microcapsule with a functionalized silica particle to form a second microcapsule having an orthogonally-bound silica particle.

According to another embodiment, a microcapsule is provided. The microcapsule comprises a polymer matrix forming a wall of a microcapsule; a payload agent inside the microcapsule; a catalyst; and a silica support, wherein the silica support is covalently linked to the polymer matrix, and to the catalyst.

According to another embodiment, a method of making a microcapsule is provided. The method includes forming a first microcapsule having a first payload agent inside the microcapsule and a first orthogonal-functionalized unit incorporated into the wall of the first microcapsule; forming a second microcapsule having a second payload agent inside the microcapsule and a second orthogonal-functionalized unit incorporated into the wall of the second microcapsule; and reacting the first microcapsule with the second microcapsule to form a linked microcapsule.

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

BRIEF DESCRIPTION OF THE SEVERAL VIEWS OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, for the disclosure may admit to other equally effective embodiments.

DETAILED DESCRIPTION

The present disclosure relates to the formation of microcapsules having encapsulated payloads. More particularly, some embodiments relate to a self-healing composite materials and microcapsules having encapsulated self-healing agents.

Microcapsules are widely used as release systems containing, for example, self-healing agents. The rupture and eventual release of the payload is dependent on breaking the polymer shell, which is typically done mechanically through scratching, puncturing, or other mechanical means directly applied to the polymer surface. The microcapsules described herein may be opened mechanically or chemically, as described further below. As used herein, the term "microcapsule" is used to refer to capsules that are in a range of about 10 microns to 1000 microns in diameter. However, it will be appreciated that the following disclosure may be applied to capsules having a smaller size (also referred to as "nanocapsules").

As used herein, the term "CatCapsule" is used to refer to microcapsules and nanocapsules having a catalyst. CatCapsule can also be referred to as "Catpsule." In some embodiments, the CatCapsules may be a microcapsule comprising a material having a polymer matrix, wherein the microcapsule is modified with a catalyst and an orthogonally-bound silica support, and the microcapsule filled with a self-healing agent. Alternately, and in some embodiments, the CatCapsules may be a microcapsule comprising i) a first microcapsule having orthogonal functionality encapsulating a catalyst and optionally a solvent; separately encapsulated from ii) a second microcapsule with orthogonal functionality encapsulating a self-healing agent and optionally a solvent. In some embodiments, the first microcapsule is covalently bonded, optionally through a linking group, to the second microcapsule.

The disclosure herein relates to incorporating a self-healing agent into polymeric microcapsules having an orthogonally-bound catalyst. Orthogonal means that the catalyst is bonded to the microcapsule using a chemistry that does not respond to any materials in the microcapsule or the environment of the microcapsule, such that if the microcapsule is ruptured, the material inside is activated by the catalyst to react with, or within, the environment of the microcapsule without disrupting the bond between the catalyst and the microcapsule. As discussed below, the orthogonal small molecule can bond to a catalyst species using a chemistry orthogonal to the payload.

The orthogonally-bound catalyst allows for localization of the catalyst closer to the newly released resin that is being introduced due to rupture of the microcapsule. For example, the catalyst is tethered to the microcapsule, which allows for placement of the catalyst a set distance away from the capsule shell, and prevents the self-healing agent closing only the capsule and not the crack throughout the polymer matrix. Moreover, the catalyst is able to react faster due to its closer proximity to the newly released resin. The distance may be empirically determined. For example, the capsule diameter and the catalyst loading level in the shell can be varied in a multivariate design of experiments and the optimal conditions determined from the results.

CatCapsules, as disclosed herein, have the ability to autonomously self-heal cracks as a direct result of the incorporation of the nano/microcapsules into a polymer resin. The nano/microcapsules will rupture and supply a large amount of self-healing agent to a specific area where a crack is forming. Due to the localization of the catalyst bound on the surface of the microcapsule, the released self-healing agent can readily react with the catalyst and thus, allow for a faster response when a capsule is ruptured.

The use of CatCapsules reduces the number of components to be added to a polymeric resin in order to generate self-healable materials. By creating an all-in-one microcapsule with orthogonally-bound catalyst, the processing steps are reduced due to fewer chemicals that need to be added in order to generate self-healing composites. The steps to produce the self-healing composite are: dispersing the CatCapsules in solvent; blending the CatCapsule into a resin; and processing the composite. Any suitable resin can be used including polyurethane, epoxies, polycarbonates, bio-based polymers, polyethylene terephthalate, fluoropolymers, polyvinyl chlorides, polyolefins, polysulfones, silicone, polyethylenimine, polyacrylates, polyimides, polyamides, other polyesters, and other polyethers. To use these resins, the healing chemistry should be compatible with the base polymer so that the resin can be healed. For example, if the base polymer is a polyurethane, the self-healing agent should comprise diol monomers and diisocyanate monomers. One skilled in the art will know what self-healing agents (or monomers) are needed to heal the various polymer resins.

Advantageously, these CatCapsules can be generated with homogenous size distributions allowing for controlled release; can be made to avoid releasing payloads in undesirable situations; can be utilized as a functional filler for polymer composites that will increase mechanical strength of the composite. The CatCapsules can find usage in multiple applications including pharmaceutical products, insulation technologies, printed circuit boards, bezels, smart textiles, agricultural products, and consumer products such as food products, household products, and personal care products. For example, including the silica in the CatCapsules allows reduction or replacement of silica fillers that are present in many polymeric materials such as circuit boards.

This disclosure includes chemical structures that show atomic compositions of compounds and relative bonding arrangements of atoms in a chemical compound. Unless specifically stated, the geometric arrangement of atoms shown in the chemical structures is not intended to be an exact depiction of the geometric arrangement of every embodiment, and those skilled in the chemical arts will recognize that compounds may be similar to, or the same as, the illustrated compounds while having different molecular shapes or conformations. For example, the structures denoted herein may show bonds extending in one direction, while embodiments of the same compound may have the same bond extending in a different direction. Additionally, bond lengths and angles, Van der Waals interactions, isoelectronic structures, and the like may vary among instances of the same chemical compound. Additionally, unless otherwise noted, the disclosed structures cover all stereoisomers, conformers, rotamers, isomers, enantiomers, of the represented compounds.

Numbered chemical structures are numbered using numbers, or numbers and letters, in parentheses. Numbered chemical reaction schemes are numbered using numbers, or numbers and letters, in square brackets. Unless otherwise noted, chemical reactions are performed at ambient conditions or under slight heating with no special atmosphere or head space, and may be performed using standard organic solvents to manage mix properties such as viscosity and flow index.

According to some embodiments, and described below, the self-healing composite material is a CatCapsule. The CatCapsule may be catalyst-modified microcapsules with orthogonally-bound silica supports, wherein the microcapsule contains a self-healing agent. In an exemplary process, and as described below a method of preparing CatCapsules includes preparation of self-healing microcapsules comprising orthogonal functionality; synthesis of a functionalized silica support; covalently linking the functionalized silica support with the orthogonal-functionalized microcapsule; and covalently linking a catalyst to the microcapsule having orthogonally-bound silica supports. These steps are set forth in their preferred order. It must be understood, however, that the various steps may occur simultaneously or at other times relative to one another. Moreover, those skilled in the art will appreciate that one or more steps may be omitted.

Prophetic Preparation of Microcapsules Comprising Orthogonal Functionality

Figure 1:
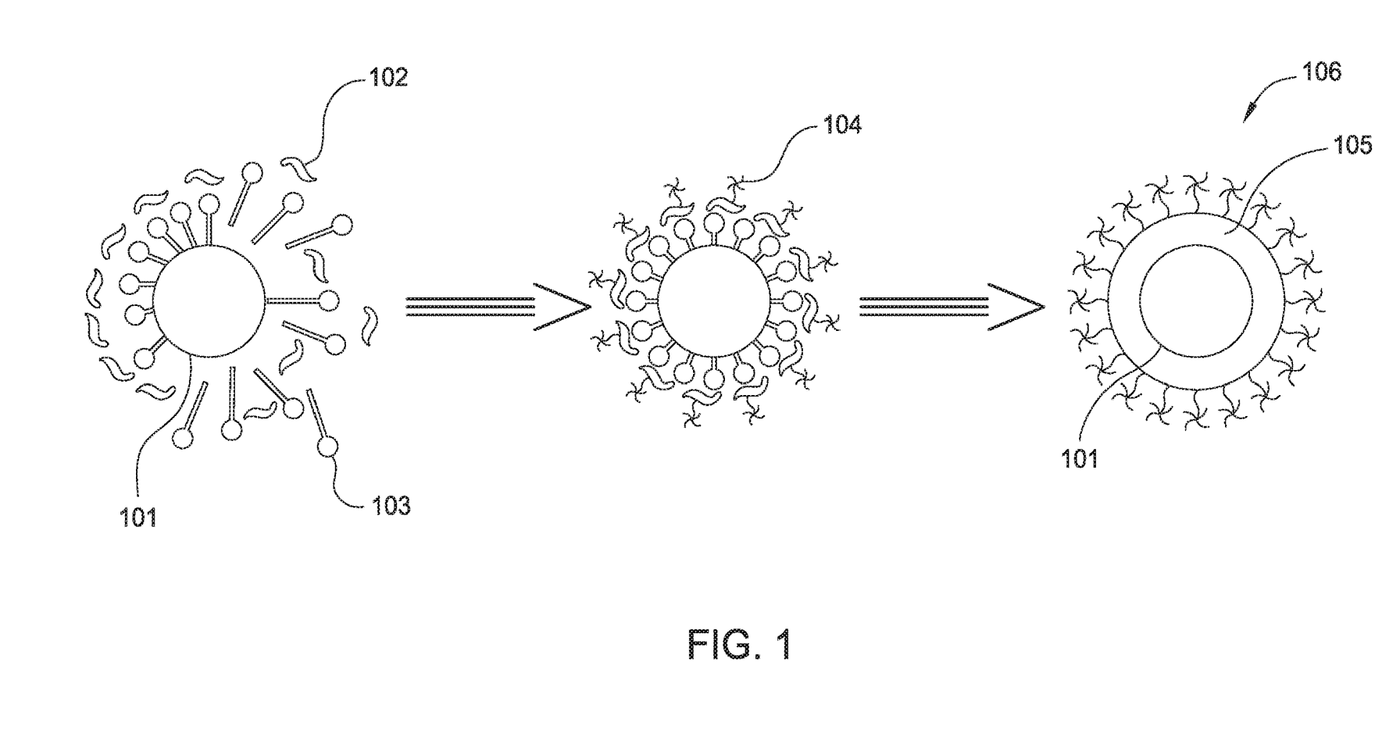
FIG. 1 shows formation of an exemplary payload-filled microcapsule according to some embodiments.

FIG. 1 shows formation of an exemplary payload-filled microcapsule, according to some embodiments. The payload is generally a liquid that can react to form a solid, and may be a self-healing agent. The shells of the microcapsule are made of poly(urea-formaldehyde) groups and can include moieties or units that are orthogonally functionalized. In FIG. 1, payload-filled microcapsules comprising orthogonal functionality 106 are formed using an oil-in-water emulsion technique, also referred to as an emulsion polymerization, to create a protective polymeric shell 105 around a payload core 101. The orthogonal functionality is incorporated into the polymeric shell 105, and is later used to attach a catalyst to the polymeric shell 105.

In the example of FIG. 1, a payload 101 represents an oil phase that is dispersed into an aqueous continuous phase and stirred to begin an emulsion process. As illustrative, non-limiting examples, the payload 101 (or multiple payloads) may include a self-healing agent, curing agents, a solvent, catalysts, or a combination thereof. One example of a payload agent 101 that may be used is a latent curing agent such as N-ethylpiperazine. It will be appreciated that various payload(s) may be selected to provide various functionalities for various applications. Other possible payloads 101 could be polymerizable molecules such as cyclic olefins, norbornene, substituted norbornene, cyclooctadiene, substituted cyclooctadiene, lactones, acrylates, acrylic acids, styrenes, isoprene, butadiene, molecules having isocyanate functional groups along with molecules having hydroxyl functional groups, and epoxies. In some cases, these agents may require an activator such as a catalyst and/or initiator. In some cases, these agents act as self-healing agents. Additionally, solvents could be incorporated into the capsules which could be chosen from aprotic solvents, protic solvents, or a mixture of the two.

A cross-linking agent 102, such as formaldehyde, is reacted with a polymeric emulsifying agent 103, such as ethylene maleic anhydride copolymer, urea (or melamine), and orthogonal-functionalized small molecules 104 to form a capsule wall around the payload. Other cross-linking agents 102 may be used including glutaraldehyde, di-acid chloride, and derivatives thereof. The orthogonal-functionalized small molecules become a unit that is incorporated into the wall of the microcapsule. Other polymeric emulsifying agents 103 may be used including whey protein isolate, sodium caseinate, a surfactant, and derivatives thereof. These materials help to stabilize the emulsion so that the capsule wall has time to form around the payload, but do not participate in formation of the capsule wall. Particle size may be controlled by adjusting a stir speed during the reaction. For example, a faster stir speed may result in formation (on average) of smaller ("finer") particles than a slower stir speed. Depending on what surfactant is used, the surfactant can also control particle size, such that more surfactant allows smaller particles to exist for a longer duration during the emulsion polymerization.

An example of orthogonal-functionalized small molecule 104 includes phloroglucinol (benzene-1,3,5-triol)-derivative 104A:

104A

Structure 104A is an unsaturated mono-ether of the triol phloroglucinol. In structure 104A, $R^1$, $R^2$, $R^3$ and $R^4$ may be a hydrogen, alkyl group, alkenyl group, phenyl group, and alkoxy group.

The second part of the reaction diagram of FIG. 1, illustrates that a curing stage may be used to complete the reaction between the cross-linking agent and the polymeric emulsifying agent to form the microcapsules or nanocapsules, the size of such capsules depending on a stir speed. These microcapsules are then incorporated within a polymeric matrix 105 (also referred to as a polymeric shell) to which they would covalently bind. The amount of microcapsules needed is empirically determined based on the rheology of the resins, the particle size of the microcapsule, and the amount needed to reach the desired payload content for release.

In another embodiment, the emulsion polymerization may contain a mixture of different orthogonal-functionalized small molecules. The orthogonal-functionalized small molecules may be mono-, di-, or tri-functionalized.

The payload-containing microcapsule with walls having orthogonal-functionalized small molecules 104, or a combination of orthogonal-functionalized small molecules, may be prepared according to the following process. To a stirring aqueous solution containing an ethylene maleic anhydride (EMA) copolymer surfactant, urea (or melamine), and ammonium chloride ($NH_4Cl$), an orthogonal-functionalized small molecule (for example, 104A), or an orthogonal-functionalized small molecule (for example, 104B), or a combination thereof, may be added. The pH may be adjusted to about 3.5 by adding NaOH and HCl (or other suitable acids and bases), followed by the addition of an emulsifying agent (for example, a self-healing agent). The payload may be added with other ingredients, such as monomers and/or pre-polymers, stabilizers, solvents, viscosity modifiers, odorants, colorant/dyes, blowing agents, antioxidants, or co-catalysts, or a combination thereof. Formaldehyde (or other suitable cross-linking agents) is added, which acts as a curing agent to complete the polymeric shell formation. The resulting microcapsules may be subsequently washed and sieved to remove unreacted material. Attachment of a catalyst that activates the payload to solidify is described below.

Thus, FIG. 1 illustrates a particular embodiment of a process of producing a microcapsule (having an encapsulated payload). The capsule may have orthogonal-functionalized small molecule 104, or a combination of orthogonal-functionalized small molecules, as shown by microcapsule 106. The payload, which may be a self-healing agent, is incorporated into a polymeric microcapsule that has small molecule blocks having orthogonal functionality, affording the ability to covalently bind to the polymeric matrix or to covalently bind to a separate moiety such as a silica support. After incorporation of the microcapsules into a polymeric matrix, an end user can rupture the capsules by various means, including using chemical means. An end user may also rupture and release the payload via scratching, puncturing, or other mechanical means.

Scheme 1: Example Preparation of Orthogonal-Functionalized Small Molecules

107

104A (R$^1$, R$^2$, R$^3$, R$^4$ = H)

As an example of another embodiment and as shown in Scheme 1, an orthogonal-functionalized small molecule 104 may be prepared according to the following process. To a stirring solution of phloroglucinol 107 in THF and/or ether, at a temperature of about 0° C. to about room temperature, is added a sodium hydride (NaH) suspension, potassium carbonate (K$_2$CO$_3$), or triethylamine. Next, allyl chloride is added to the stirring solution which is maintained at a temperature of about 0° C. to about room temperature, and then allowed to warm to room temperature to give 5-(allyloxy)benzene-1,3-diol (104A where R$^1$, R$^2$, R$^3$, R$^4$=H). For this reaction, any suitable base may be used, including a hydride base, a hydroxide base, or an amine base. Any suitable solvent for the reaction may be used, including ether and THF. A mixture of mono-, di-, and tri-functionalized allyl ethers may form from the reaction. The amount of mono-, di- and tri-functionalized allyl ethers can be controlled by stoichiometry and dilute conditions. Mono-, di-, and tri-functionalized allyl ethers may participate in the emulsion polymerization process.

The allyl-functionalized small molecule 104A is a non-limiting example of orthogonal-functionalized small molecules. The allyl group (or alkene group) is the orthogonal functionality in this case, and can be used to attach allyl-reactive species to the capsule. As described above, the allyl group is orthogonal because a payload and catalyst can be used where they do not react with the catalyst attachment resulting from use of the allyl group. Other examples of orthogonal groups, as shown below, include alkyne structures such as 104B (via reaction of phloroglucinol with propargyl chloride, for example), (meth)acrylate structures such as 104D and 104E (via reaction of phloroglucinol with (meth)acryloyl chloride, for example), and epoxy-functionalized phloroglucinol such as 104C (via reaction of phloroglucinol with epichlorohydrin, for example) which can be used to react with the appropriate moiety within the polymeric resin as well as the appropriate moiety of the modified silica particle. 104A-104E are monoethers of a triol.

104A

104B

104C

104D

104E wherein R$^1$, R$^2$, R$^3$, R$^4$, and R$^5$ includes a hydrogen, alkyl group, alkenyl group, phenyl group, and alkoxy group. The choice of R group can affect the reaction between the orthogonal functionality of the microcapsule and the functionalized silica support, as described below. Under standard conditions that react unsubstituted alkenes, alkynes, epoxies, and acrylates, the substituted version would likely show reduced reactivity. However, one skilled in the art would know of catalyst systems that allow for reaction of the substituted versions alkenes, alkynes, epoxies, and acrylates.

During formation of the orthogonal-functionalized small molecules 104A-E, as described in Scheme 1, substitution at R$^1$, R$^2$, and R$^5$ will likely have minimal impact on the formation. For products 104A-C, substitution at R$^3$ and R$^4$ will lower reactivity during its formation, and therefore one skilled in the art would know to switch conditions from S$_N$2 to S$_N$1 conditions. S$_N$1 conditions require polar solvents like alcohols.

Any triol or functionalized triol, not just phloroglucinol, capable of capsule formation through emulsion polymerization can be used. For example, other functionalized triols may include functionalized resveratrol (104F) and its isomers, functionalized alkyltriol (104G), functionalized naphthalenetriols (104H) and its isomers, functionalized anthracenetriols (104J) and its isomers. Isomers include varied substitution of the hydroxyls on the phenyl rings and alkyl chains, as well as cis and trans isomers. 104F, 104G, 104H, and 104J are monoethers of a triol W includes allyl groups and substituted allyl groups, propargyl groups and substituted propargyl groups, epoxy groups and substituted epoxy groups, acrylate groups and substituted acrylate groups, methacrylate groups and substituted methacrylate groups, and derivatives of each of these groups, as described above with phloroglucinol.

The orthogonal-functionalized small molecules 104 may be mono-, di-, and tri-functionalized. The amount of mono-, di- and tri-functionalized orthogonal-functionalized small molecules can be controlled by stoichiometry and dilute conditions. Mono-, di-, and tri-functionalized small molecules may participate in the emulsion polymerization process.

Microcapsules with orthogonal functionality at the surface thereof allows for the ability to bind (through, for example, the allyl group) into the polymer to increase rupture of the capsule, as described thereof. For example, a chemically reactive functionality can be bound to the capsule that increases its susceptibility to rupture. Moreover, microcapsules with orthogonal functionality can provide for dual functionality. For example, microcapsules with orthogonal functionality can be used for filler materials having orthogonal flame retardants on the outside of the capsule and a self-healing agent on the inside of the capsule. For example, a phosphorus moiety can be incorporated into the capsule wall, for example by including an orthogonal small molecule that is a reaction product of phloroglucinol (or resveratrol, or any of the other triol materials described herein) with phosphoric acid, or an ester thereof. Phosphate groups, phosphonate groups, and remaining hydroxyl groups, will react with urea, for example, in an emulsion polymerization to attach the phosphorus moiety to the capsule wall. In addition, microcapsules with orthogonal functionality can covalently bind to a silica support, as further described below, which may also act as a filler material.

Prophetic Preparation of Half-Functionalized Silica Supports

Figure 2A:
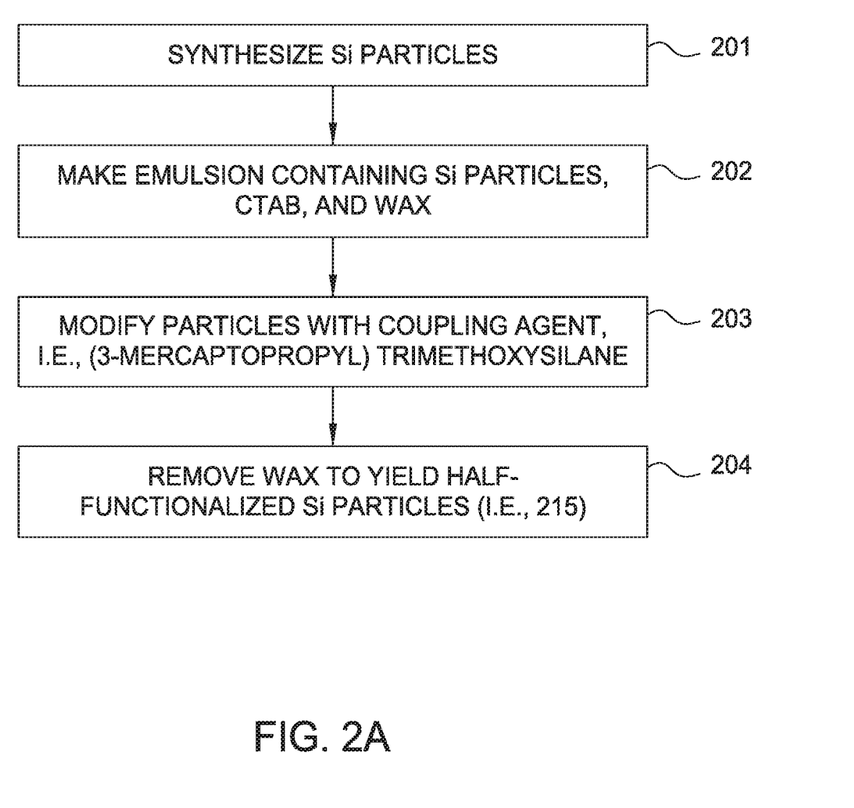
FIG. 2A is a flow chart illustrating the formation of an exemplary silica support according to some embodiments.

FIG. 2A shows a flow chart illustrating the formation of an exemplary silica support according to some embodiments. The silica support may be half-functionalized, as shown by 215 in FIG. 2B. These steps are set forth in their preferred order. It must be understood, however, that the various steps may occur simultaneously or at other times relative to one another. Moreover, those skilled in the art will appreciate that one or more steps may be omitted.

Silica nanoparticles and microparticles may be prepared through a modified Stöber synthesis, at operation 201. Utilizing hydrolysis and condensation of silica precursor tetraethoxysilane (TEOS) in ethanol, and in the presence of ammonia as catalyst (Stöber et al., Controlled Growth of Monodisperse Silica Spheres in the Micron Size Range, *J. Colloid Interface Sci.* 1968, 26, 62-69), monodispersed silica particles that have diameters in the nanometer size range to micron size range may be made. By varying the concentration of water in the synthesis, the diameter of the particles can be varied. After synthesis, the particles may be removed from their mother liquor solution to halt the growth of the particles and obtain the desired particle size.

As generally described above, silica particles (200 nm) may be synthesized by the following exemplary process. TEOS is distilled prior to use and all other chemicals were used as purchased. Ethanol (200 proof, 5.38 mL) and TEOS (0.38 mL) are added to a 20 mL scintillation vial and shaken to mix. In a separate vial, 2M ammonia (3.75 mL) and deionized water (0.49 mL) are added and shaken to mix. The ammonia solution is then poured into the ethanol/TEOS solution and shaken for 10 seconds. Vials were then left static for 24 h. After reaction period, particles are centrifuged and rinsed with ethanol at least 3 times to remove undesired particles and yielding silica nanoparticles. The final molar ratio of TEOS:ammonia:water was 1.00:4.39:15.95.

In preparation of a half-functionalized particle 215, an emulsion may be produced, at operation 202 using a wax emulsion technique (e.g., using paraffin wax). The emulsion contains cetyltrimethylammonium bromide (CTAB). CTAB facilitates silica particles gathering at the oil-water interface, thereby allowing reactants, compounds, components, and the like to attach to the part of the silica that protrudes across the interface into the oil phase.

The silica particles are dispersed in an ethanol/water solution (6.7%, w/w) and heated at an elevated temperature of about 65° C. (to melt the wax that will be added later). To the dispersion is added CTAB (commercially available from Sigma-Aldrich) ($C_{CTAB}/S_{Silica}=5\times10-6$ mol L-1m-2-$S_{Silica}$) with heating, to partially hydrophobize the surface of the particles. A low concentration of CTAB is used to avoid the creation of a bilayer at the surface of the particles. Paraffin wax (1.0 g, CAS no. 8002-74-2) is then added to the particle suspension. Once the wax has melted, the mixture is vigorously stirred (9000 rpm) for about 80 seconds at the elevated temperature to form an emulsion. The mixture is allowed to cool to about room temperature as the paraffin wax solidifies into solid droplets with the particles partially protruding from the surface. The particles are washed with acid to remove the CTAB and expose a bare particle surface. The paraffin wax droplets are then filtered. As illustrated by structure 210 in FIG. 2B, silica particles 211 partially extrude from a paraffin wax substrate 212.

Figure 2B:
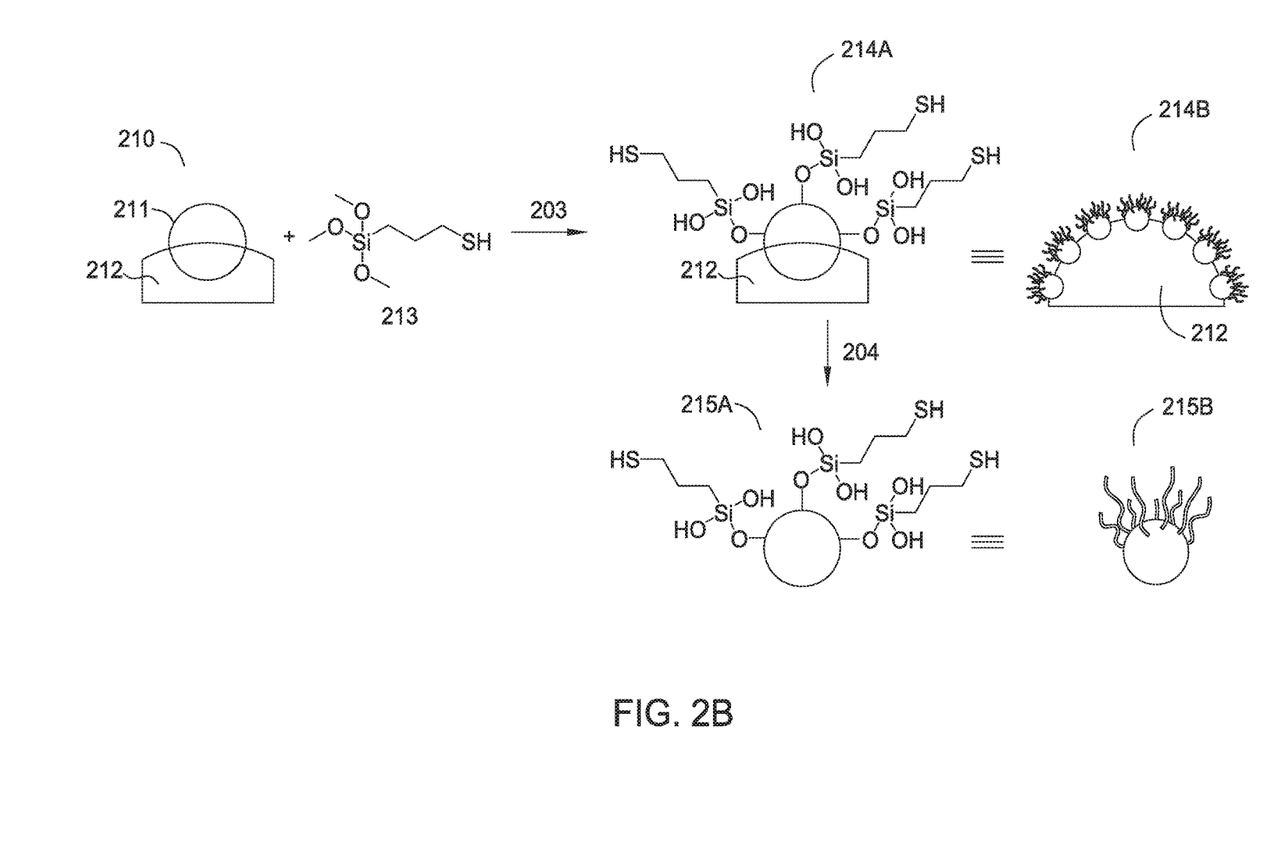
FIG. 2B shows formation of exemplary modified silica particles according to some embodiments.

In a particular embodiment, the surface of the silica particles may then be modified with a coupling agent, such as a (3-mercaptopropyl)trimethoxysilane 213 solution in ethanol and aqueous ammonia, at operation 203, to provide the modified silica particles in wax illustrated in structures 214A/214B. The coupling agent is used in order to attach the particles to a resin, which may be a microcapsule having orthogonal functionality. Modification may be done with any suitable coupling agent, so long as it is reactive towards the microcapsule having orthogonal functionality. This silane modification may proceed according to the following exemplary process. The silica particles, as colloidosomes (e.g., the silica particles partially extruding from a paraffin wax) are dispersed into toluene (20 mL) and stirred to form a suspension. To the suspension is added (3-mercaptopropyl)trimethoxysilane (2.0 mL) in ethanol and aqueous ammonia. The reaction is heated to about 45° C. and stirred for 48 hours. The suspension is then cooled to room temperature to form solid droplets of half-functionalized silica particles in paraffin wax 214A/B. As illustrated by FIG. 2B, structure 214A is a single silica particle with surface thiol functionality, which partially protrudes from wax substrate 212; structure 214B shows multiple functionalized particles partially extruding from wax.

At operation 204, the wax may be removed from modified silica particles 214 to create half-functionalized silica particles 215 according to the following exemplary process. The modified silica particles are removed from the wax by mixing the modified silica particles with a suitable solvent at elevated temperatures. Suitable solvents include hydrocarbon solvents such as benzene. The colloidal solution is separated by high-speed centrifuge, and decanted at least three times and dried in vacuo to provide half-functionalized particles free of wax shown at structures 215A/215B.

These half-functionalized silica particles free of wax 215 are also referred to as modified silica particles. In an embodiment, the modified silica particles may be used to prepare microcapsules having orthogonally-bound silica supports, as described below.

Prophetic Preparation of Microcapsules Having an Orthogonally-Bound Catalyst

Figure 3A:
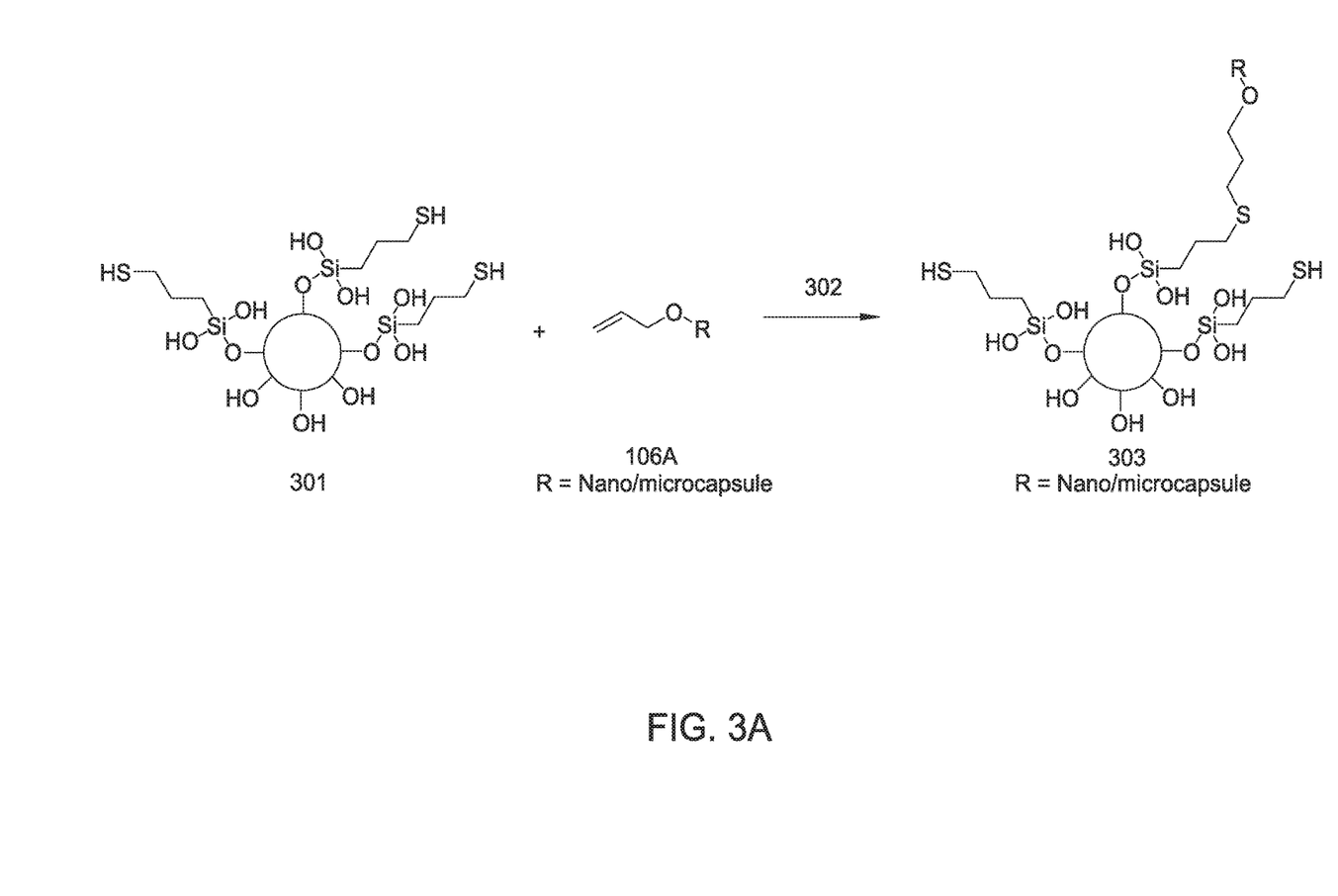
FIG. 3A shows an exemplary reaction between the modified silica particle and the orthogonal functionality of the microcapsule according to some embodiments.
Figure 3B:
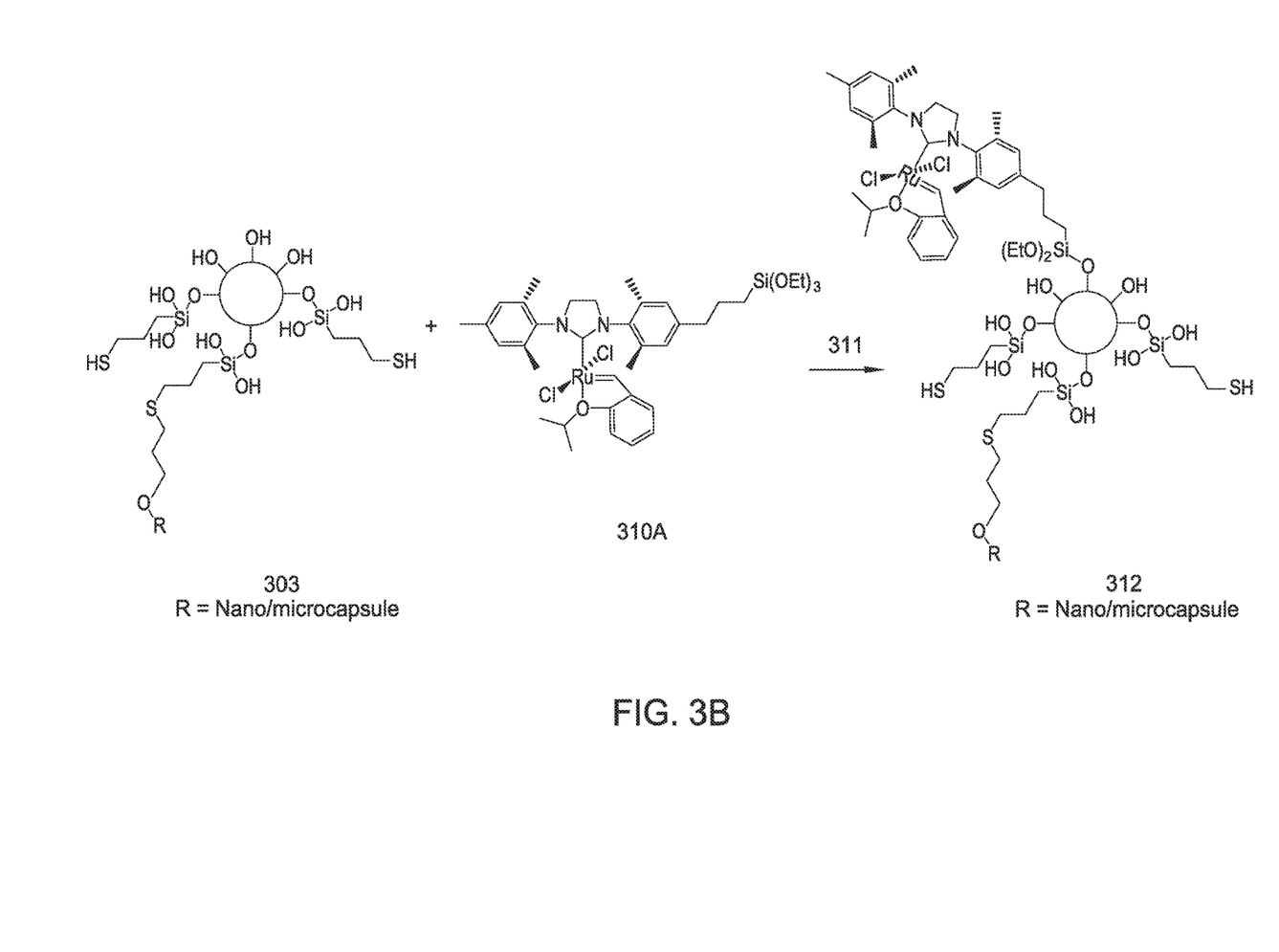
FIG. 3B shows an exemplary reaction between an orthogonally-bound silica support of a microcapsule and a catalyst to form a CatCapsule, according to some embodiments.

FIGS. 3A and 3B show formation of a CatCapsule, according to some embodiments. The CatCapsules may be a microcapsule that incorporates a self-healing agent payload, and optionally a solvent, into the polymeric microcapsule, as described above, wherein the polymeric microcapsule has an orthogonally-bound catalyst. The orthogonally bound catalyst may be grafted onto an orthogonally-bound silica support of a microcapsule.

According to an embodiment, and referring to FIG. 3A, the thiol-modified silica particles 301, which are free of wax, may undergo reaction with a microcapsule having orthogonal functionality (for example, 106A, bearing an allyl group). The reaction produces a microcapsule with orthogonally-bound silica supports 303.

As shown in FIG. 3B, operation 302 may be a thiol-ene click reaction, which may be performed by the following exemplary process. To a solution of microcapsule having orthogonal functionality 106 (for example, 106A) in a suitable solvent, such as chloroform, are added thiol-modified silica particles 301, an amine base, and an initiator, such as 2,2'-azobis(isobutyronitrile) (AIBN). The reaction may be heated to temperatures of about 60° C. to about 80° C. and stirred until completion to provide a microcapsule with orthogonally-bound silica supports 303. Other suitable solvents for the reaction include polar aprotic solvents such as tetrahydrofuran (THF), dimethyl sulfoxide (DMSO), acetonitrile, and dimethylformamide (DMF) as well as non-polar aprotic solvents such as toluene. Neat solvents or a mixture of solvents may be used. Suitable amine bases for the reaction include triethylamine and N, N-diisopropylethylamine (DIPEA).

The thiol-ene click reaction may proceed using ultraviolet (UV) light (wavelength about 365 nm to about 405 nm) or heat. Suitable photoinitiators include (2,4,6-trimethylbenzoyl)diphenylphosphine oxide (TMDPO), 2,2-dimethoxy-2-phenyl acetophenone (DMPA), benzophenone, thioxanthone, and camphorquinone. Photoinduced reactions can be run at temperatures of about room temperature. Suitable thermal initiators include AIBN and benzopinacol at 60° C. to about 80° C. Standard procedures for solvent removal can be used. If a vacuum is used to remove the solvent, the pressure should be monitored to avoid rupturing the microcapsule. Heat may also be added to dry the material, but the heat should remain at a temperature lower than the boiling points and/or melting points of the microcapsule components.

It should be understood that other orthogonal-functionalized microcapsules 106 may be used in to covalently link the microcapsule to the silica support. These other orthogonal-functionalized microcapsules may be based off of orthogonal-functionalized small molecules 104, as described above. For example, the propargyl group of 104B, which is incorporated in the wall of the microcapsule 106, can undergo a thiol-yne click reaction with 301 to yield a product similar to 303, while the epoxy functionality of 104C can undergo a thiol-epoxy click reaction, to give a product similar to 303.

For the thiol-yne click reaction, which will provide an alkenyl sulfide, the reagents are similar to the thiol-ene reaction. Suitable thermal initiators such as AIBN may be used. Suitable photoinitiators may be used including TMDPO, DMPA, benzophenone, thioxanthone, and camphorquinone. Other catalysts for the reaction include triethylborane, indium(III) bromide), cationic rhodium and iridium complexes, thorium and uranium complexes, and caesium carbonate. Suitable solvents include those used for the thiol-ene reaction. Standard procedures for solvent removal can be used. If a vacuum is used to remove the solvent, the pressure should be monitored to avoid rupturing the microcapsule. Heat may also be added to dry the material, but the heat should remain at a temperature lower than the boiling points and/or melting points of the microcapsule components.

For the thiol-epoxy click reaction, which produces a thiol-alcohol, various bases can be used. However, care must be taken to avoid unwanted side reactions and rupture of the microcapsule. Harsh bases such as hydroxyls and hydrides should likely be avoided. Carbonates and amine bases, particularly hindered or tertiary amines being less reactive, are suitable. Moreover, mild reagents such as titanium (IV)

isopropoxide can catalyze the reaction. Those skilled in the art would be able to select suitable photochemical and thermochemical initiators for the reaction. Standard procedures for solvent removal can be used. If a vacuum is used to remove the solvent, the pressure should be monitored to avoid rupturing the microcapsule. Heat may also be added to dry the material, but the heat should remain at a temperature lower than the boiling points and/or melting points of the microcapsule components.

Additionally, the thiol of 301 may undergo other thiol click reactions, or Michael additions, with other functional groups, such as methacrylates 104D, and acrylates 104E, to form a microcapsule with an orthogonally bound silica support similar to 303. However, care must be taken to avid side reactions and rupture of the microcapsule. Harsh bases such as hydroxyls and hydrides should likely be avoided. Carbonates and amine bases, particularly hindered or tertiary amines being less reactive, are suitable. Moreover, mild reagents such as titanium (IV) isopropoxide can catalyze the reaction. Those skilled in the art would be able to select suitable photochemical and thermochemical initiators for the reaction. Standard procedures for solvent removal can be used. If a vacuum is used to remove the solvent, the pressure should be monitored to avoid rupturing the microcapsule. Heat may also be added to dry the material, but the heat should remain at a temperature lower than the boiling points and/or melting points of the microcapsule components.

In another embodiment, the walls of the microcapsules 106 contain mixtures of two or more different orthogonal-functionalized small molecules 104. For example, the walls of the microcapsule may contain a mixture of allylic and propargylic functionality, or a mixture of epoxy and propargylic functionality, which could then react with the thiols of the silica support. Such microcapsules, bearing multiple functionality, may allow for further synthetic manipulations towards divergent sets of microcapsules.

FIG. 3B shows formation of a CatCapsule, according to some embodiments. The CatCapsules may be a microcapsule that incorporates a self-healing agent payload, and optionally a solvent, into the polymeric microcapsule, as described above, wherein the polymeric microcapsule has an orthogonally-bound catalyst. The orthogonally-bound catalyst may be grafted onto an orthogonally-bound silica support of a microcapsule to provide a catalyst-modified microcapsule with orthogonally-bound silica support.

In an embodiment, a self-healing composite material may comprise a CatCapsule; and further comprise a base polymer including polylactic acid, polyurethane, epoxies, polycarbonates, bio-based polymers, polyethylene terephthalate, fluoropolymers, polyvinyl chlorides, polyolefins, polysulfones, silicone, polyethylenimine, polyacrylates, polyimides, polyamides, other polyesters, and other polyethers. To use these resins, the healing chemistry should be compatible with the base polymer so that the resin can be healed. For example, if the base polymer is a polyurethane, the self-healing agent should comprise diol monomers and diisocyanate monomers. One skilled in the art will know what self-healing agents (or monomers) are needed to heal the various polymer resins.

According to an embodiment and referring to FIG. 3B, the grafting at operation 311, may be performed according to the following exemplary process. Inside a dry box, catalyst 310A is weighed into a vial and dissolved in any suitable solvent such as benzene. In a separate vial containing a stir bar, microcapsule with orthogonally-bound silica support 303 is weighed. The benzene solution of catalyst 310A is then transferred to the vial containing the microcapsules. The mixture is then capped and allowed to stir at about room temperature for about 46 hours. The mixture is then filtered using a fritted disc extraction thimble to remove the benzene and the thimble containing the CatCapsule is placed into a soxhlet extraction apparatus and capped with a septa. The apparatus is then removed from the dry box and placed under argon. Dichloromethane (DCM), or another suitable solvent, is added and the solid is continuously extracted with a suitable solvent such as DCM for 24 hours. The solid is then dried in vacuo for 24 hours to yield CatCapsule 312. Standard procedures for solvent removal can be used. If a vacuum is used to remove the solvent, the pressure should be monitored to avoid rupturing the microcapsule. Heat may also be added to dry the material, but the heat should remain at a temperature lower than the boiling points and/or melting points of the microcapsule components.

Catalyst 310A, [RuCl$_2$(1-(2,6-dimethyl-4-(3-(triethoxysilyl)propyl)phenyl)-3-mesityl-4,5-dihydroimidazol-2-ylidene)(=CH-o-iPrO-Ph)] may be prepared by the method described in D. Allen et al., Well-Defined Silica-Supported Olefin Metathesis Catalysts, Organic Letters 2009, 26, 62-69.

Other catalysts that can be covalently attached to the silica support include 310B [RuCl$_2$(1,3-dimesityl-4-(3-triethoxysilyl)propyl)-dihydroimidazol-2-ylidene) (=CH-o-iPrO-Ph)]) which may be prepared by the method described in Allen et al.; 310C [RuCl$_2$((1,3-dimesityl-dihydroimidazol-2-ylidene)(=CH-o-iPrO-Ph-4-OCH$_2$—C(=C)—N=N—N(propyltrimethoxysilyl))] which may be prepared according to J. Lim et al., Mesoporous Silica-Supported Catalysts for Metathesis: Application to a Circulating Flow Reactor, Chemical Communications 2010, 46, 806-808, and references cited therein; 310D [RuCl$_2$(1,3-dimesityl-4-(3-triethoxysilyl)propylcarbamate)-dihydroimidazol-2-ylidene) (=CH-o-iPrO-Ph)] which may be prepared by the method described in A. Monge-Marcet et al., Catalytic Applications of Recyclable Silica Immobilized NHC-Ruthenium Complexes, Tetrahedron 2013, 69, 1, 341-348; 310E [{(RO)3SiO}Mo(=NAr)(=CHtBu)(CH$_2$tBu)] (Ar=2,6-iPr$_2$C$_6$H$_3$) which may be prepared according to F. Blanc et al., Surface Versus Molecular Siloxy Ligands in Well-Defined Olefin Metathesis Catalysts: [{(RO)3 SiO}Mo(=NAr)(=CHtBu)(CH2tBu)], Angewandte Chemie International Edition 2006, 45, 1216-1220; 310F [[{(RO)3SiO}Mo(=NAr)(=CHtBu)(NPh$_2$)] (Ar=2,6-iPr$_2$C$_6$H$_3$)] which may be prepared according to F. Blanc et al., Highly Active, Stable, and Selective Well-Defined Silica Supported Mo Imido Olefin Metathesis Catalysts, Journal of the American Chemical Society 2007, 129, 1044-1045; 310G [[{(RO)3SiO}Mo(=NAr)(=CHtBu)(OtBu)] (Ar=2,6-iPr$_2$C$_6$H$_3$)] which may be prepared according to F. Blanc et. al., Dramatic Enhancement of the Alkene Metathesis Activity of Mo Imido Alkylidene Complexes Ipon Replacement of One tBuO By a Surface Siloxy Ligand, Dalton Transactions 2008, 3156-3158; and tungsten imido alkylidene catalyst (not shown) [(SiO)W(NAr)(CHtBu)(CH$_2$tBu)] which may be prepared according to B. Rhers et al., A Well-Defined, Silica-Supported Tungsten Imido Alkylidene Olefin Metathesis Catalyst, Organometallics 2006, 25, 3554-3557. Of note, Schrock-type catalysts are less stable to air and moisture. It should be understood that the catalysts described herein are only exemplary catalysts. Other catalysts, particularly Ruthenium catalysts, may be used so long as the catalyst is compatible with grafting onto a silica support.

These Ruthenium-based Grubbs-type catalysts are useful for olefin metathesis to create polymers via ring-opening metathesis polymerization or cross-metathesis. A ring-opening metathesis polymerization (ROMP) of alkenes is a type of olefin metathesis chain growth polymerization typically catalyzed by ruthenium-based carbene complexes, such as Grubbs catalysts, particularly Grubbs second-generation catalysts. Other organometallic catalysts of transition metals such as tungsten, molybdenum (Schrock-type, i.e., 310C-310E), rhenium, and titanium carbene complexes are useful for ROMP and cross-metathesis. ROMP occurs for ring-opening metathesis polymerization monomers including strained cyclic olefins, including norbornene, substituted norbornene, cyclooctadiene, substituted cyclooctadiene, derivatives of such compounds, and combinations thereof. Such cyclic olefins, and combinations of different cyclic olefins may be encapsulated in the microcapsule as a component of the self-healing agent(s). Cross-metathesis may occur for any suitable monomer including acyclic dienes and unsaturated esters, such as ethyl oleate (Ethyl (Z)-octadec-9-enoate), derivatives of unsaturated esters (such as unsaturated carbamates and amides). Such acyclic dienes, unsaturated esters, and derivatives, and combinations thereof may be encapsulated in the microcapsule as a component of the self-healing agent(s).

Another form of olefin metathesis that can be used with the present disclosure is acyclic diene metathesis (ADMET). ADMET is a type of olefin metathesis that can be used to polymerize terminal acyclic dienes, and has high functional group tolerance. ADMET can be performed using a wide range of catalysts, including Grubbs second-generation catalysts and other catalysts as described in T. Haque et al., Acyclic Diene Metathesis (ADMET) Polymerization for Precise Synthesis of Defect-Free Conjugated Polymers with Well-Defined Chain Ends, Catalysts 2015, 5, 500-517. Acyclic dienes, and combinations of different acyclic dienes, may be encapsulated in the microcapsule as a component of the self-healing agent(s). Moreover, acrylate metathesis, a form of cross-metathesis, of the self-healing agent (monomers) can be used to heal the polymer. Grubbs second-generation catalysts (including 310A and 310B) are useful for acrylate metathesis. Acrylate metathesis can be performed on monomers such as olefins, alpha, beta-unsaturated esters and their derivatives, and combinations thereof, using Grubbs second-generation catalysts (including 310A and 310B). Such olefins, alpha, beta-unsaturated esters, and derivatives thereof (such as alpha, beta-unsaturated carbamates and amides), and combinations thereof may be used as part of the payload of the microcapsules More than one type of monomer may be used as part of the payload of the microcapsules.

It should be understood that any catalyst compatible with bonding to silica can be used for the CatCapsules described herein.

Monomers, including those listed above and throughout the description, are chosen so as to be compatible with the base polymer so that the resin can be healed. One skilled in the art will know to use a standard selection of the common monomers for the base polymers. For example, if the base polymer is a polyurethane, the self-healing agent should comprise diol monomers and diisocyanate monomers.

Suitable solvents inside the microcapsules and CatCapsules include solvents that dissolve the self-healing agent monomers. Suitable solvents include toluene, benzene, dichloromethane, acetone, chlorinated benzenes, dichloroethane, diethyl ether, and tetrahydrofuran. Neat solvents or a mixture of solvents may be used.

The overall catalyst concentration of the CatCapsules can be very low in accordance with the embodiments disclosed herein, as the catalysts only exist on the orthogonally-bound silica supports instead of existing as free particles.

Thus, a method of making a microcapsule, or CatCapsule, as described herein, comprises forming a first microcapsule having a payload agent inside the microcapsule and an orthogonal-functionalized small molecule (or unit) incorporated into the wall of the microcapsule, and optionally a solvent; and reacting the first microcapsule with a functionalized silica particle to form a second microcapsule having an orthogonally-bound silica particle. The method further comprises covalently linking the second microcapsule with a catalyst. The payload agent can be any monomer, or combinations of different monomers, described herein. The orthogonal-functionalized small molecule can be any orthogonal-functionalized small molecule described herein.

A microcapsule, or CatCapsule, as described herein, comprises a polymer matrix, a payload agent, a catalyst, and a silica support. The polymer matrix is formed from an orthogonal-functionalized small molecule, or a combination of orthogonal-functionalized small molecules, a cross-linking agent, $NH_4Cl$, a copolymer, and a solvent. The polymer matrix is covalently linked to the silica support, and the silica support is covalently linked to the catalyst. The catalyst comprises any metathesis catalyst described herein. The payload agent can be a monomer, or combinations of different monomers, described herein. The orthogonal-functionalized small molecule can be any orthogonal-functionalized small molecule described herein.

Advantageously, by creating an all-in-one microcapsule with orthogonally-bound catalyst and a self-healing agent, the processing steps are reduced due to fewer chemicals that need to be added in order to generate self-healing composites. The steps to produce the self-healing composite are: dispersing the CatCapsules in solvent; blending the CatCapsule into a resin; and processing the composite. Any suitable resin can be used including polyurethane, epoxies, polycarbonates, bio-based polymers, polyethylene terephthalate, fluoropolymers, polyvinyl chlorides, polyolefins, polysulfones, silicone, polyethylenimine, polyacrylates, polyimides, polyamides, other polyesters, and other polyethers. To use these resins, the healing chemistry should be compatible with the base polymer so that the resin can be healed. For example, if the base polymer is a polyurethane, the self-healing agent should comprise diol monomers and diisocyanate monomers. One skilled in the art will know what self-healing agents (or monomers) are needed to heal the various polymer resins; and processing the composite.

Prophetic Preparation of a Material with Distinct Microcapsules

Figure 4:
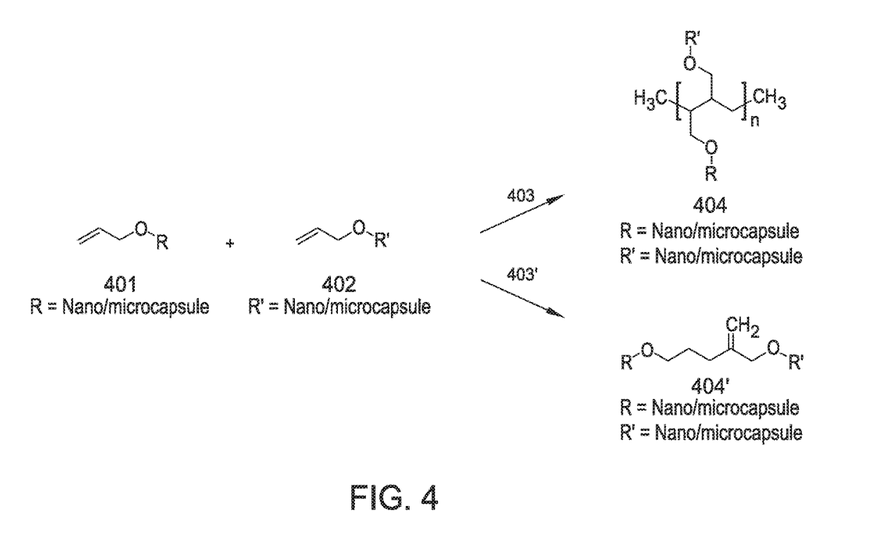
FIG. 4 shows formation of a CatCapsule wherein the catalyst is separately encapsulated from the self-healing agent according to some embodiments.

According to another embodiment, and referring to FIG. 4A, the CatCapsule may be a linked microcacapsule comprising i) a first microcapsule having orthogonal functionality encapsulating a catalyst and optionally a solvent; separately encapsulated from ii) a second microcapsule with orthogonal functionality encapsulating a self-healing agent and optionally a solvent. In this embodiment, the first microcapsule is covalently bonded, optionally through a linking group, to the second microcapsule. The orthogonal functionality of the catalyst-encapsulated microcapsule may then bond with the self-healing agent microcapsule's orthogonal functionality or with the aid of a coupling agent. Here, the catalyst is close to the capsule, yet separated by a distance.

For these embodiments, no silica support is needed. Coupling agents used to bond the distinct microcapsules include isocyanate chains to react with residual poly(urea-formaldehyde) groups of the microcapsule. If an orthogonal functionality of the individual microcapsules is used to bond the microcapsules together, those skilled in the art would be able to determine appropriate reagents for such reaction. An example is illustrated below.

In an embodiment, a self-healing composite material may comprise a CatCapsule; and a base polymer including polylactic acid, polyurethane, epoxies, polycarbonates, bio-based polymers, polyethylene terephthalate, fluoropolymers, polyvinyl chlorides, polyolefins, polysulfones, silicone, polyethylenimine, polyacrylates, polyimides, polyamides, other polyesters, and other polyethers. To use these resins, the healing chemistry should be compatible with the base polymer so that the resin can be healed. For example, if the base polymer is a polyurethane, the self-healing agent should comprise diol monomers and diisocyanate monomers. One skilled in the art will know what self-healing agents (or monomers) are needed to heal the various polymer resins.

FIG. 4 shows formation of a CatCapsule wherein the catalyst is separately encapsulated from the self-healing agent according to some embodiments. As shown in FIG. 4, the individual microcapsules 401 and 402 can be bonded together by a polymerization (403) or a coupling (403'). The polymerization can be done by using ADMET chemistry as described in T. Haque et al., Catalysts, 2015, 5, 500-517, to form 404. The reaction may create polymers or oligomers, rather than dimers. Haque et al. show various Ruthenium-carbene complex catalysts such as $[RuCl_2(CHPh)(PCy_3)_2]$, $[RuCl_2(CHPh)(IMesH_2)(PCy_3)]$ ($IMesH_2$=1,3-bis(2,4,6-trimethylphenyl)-2-imidazolidinylidene), $[RuCl_2(CH-2-OiPr-C_6H_4)(IMesH_2)]$, and $RuCl_2(CHPh)(IMesH_2)(3-BrC_5H_4N)_2]$. 404 may be prepared according to the following exemplary process. Capsules 401 and 402 (concentration of capsules is about 90 μmol/mL to about 270 μmol/mL) were added to toluene or dichloromethane (about 1.0 mL to about 3.0 mL). A Ruthenium carbene catalyst (about 20 equiv. to about 80 equiv.) is then added to the mixture, and the mixture is heated to about 50° C. for up to 8 hours. Standard procedures for solvent removal can be used. If a vacuum is used to remove the solvent, the pressure should be monitored to avoid rupturing the microcapsule. Heat may also be added to dry the material, but the heat should remain at a temperature lower than the boiling points and/or melting points of the microcapsule components.

If a coupling is used to bond microcapsules 401 and 402, the following exemplary process may be performed to make 404'. If an orthogonal functionality of the individual microcapsules is used to bond the microcapsules together, those skilled in the art would be able to determine appropriate reagents for such reaction. For example, alkenes may be linked together using hydrosilanes or dithiols. If dithiols are used, thiol-ene chemistry, as described above, can be used. Standard procedures for solvent removal can be used. If a vacuum is used to remove the solvent, the pressure should be monitored to avoid rupturing the microcapsule. Heat may also be added to dry the material, but the heat should remain at a temperature lower than the boiling points and/or melting points of the microcapsule components.

The orthogonal functionality of the microcapsules does not have to be used to couple the microcapsules together. Instead isocyanate chains to react with residual poly(urea-formaldehyde) groups of the microcapsule can be used.

Thus, a method of making microcapsules, or CatCapsules comprises forming a first microcapsule having a first payload agent inside the microcapsule and a first orthogonal-functionalized unit incorporated into the wall of the first microcapsule; forming a second microcapsule having a second payload agent inside the microcapsule and a second orthogonal-functionalized unit incorporated into the wall of the second microcapsule; and reacting the first microcapsule with the second microcapsule to form a linked microcapsule. The payload agent of the first microcapsule comprises a catalyst, a solvent, or a combination thereof, and wherein the payload agent of the second microcapsule comprises a monomer, a solvent, or a combination thereof. The monomer may any monomer, or combinations of different monomers, as described herein. The catalyst may be any metathesis catalyst described herein.

The individual microcapsules may be synthesized according to procedures described herein. For example, the emulsion polymerization can be performed, wherein the payload for one microcapsule is a self-healing agent and optionally a solvent, and the payload for another microcapsule is a catalyst and optionally a solvent.

Suitable solvents for the microcapsules and CatCapsules include solvents that dissolve the self-healing agent monomers and the catalysts. Suitable solvents include toluene, benzene, dichloromethane, acetone, chlorinated benzenes, dichloroethane, diethyl ether, and tetrahydrofuran. Neat solvents or a mixture of solvents may be used.

Prophetic Preparation of a Self-Healing Composite Material

Figure 5:
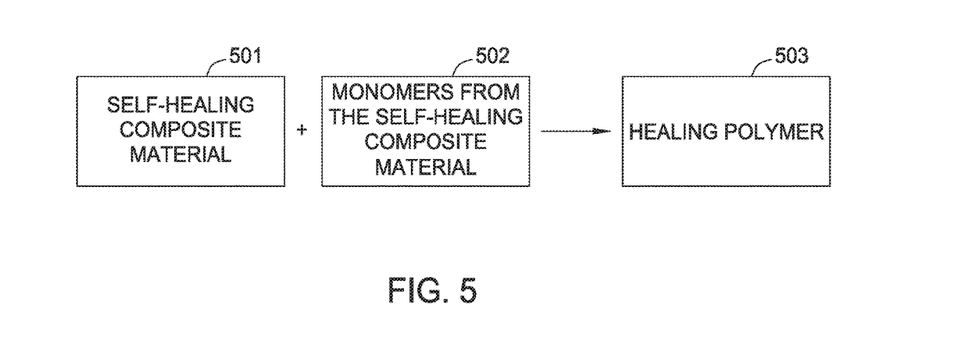
FIG. 5 is a general reaction scheme diagram illustrating the synthesis of a healing polymer produced during a healing event according to some embodiments.

Referring to FIG. 5, which is a general reaction scheme diagram that illustrates the synthesis of a self-healing polymer during a healing event in accordance with some embodiments. A crack, for example, may develop in or on the surface of the self-healing composite material 501. The crack (e.g., about 1-2 microns wide) may rupture nearby CatCapsules when the propagating crack comes in contact with the microcapsules. When this occurs, the self-healing agent(s) 502, which are optionally dissolved in a solvent, flows from the CatCapsules and fills in the crack due to capillary action. As the self-healing agent(s) flows from the CatCapsules, the agent comes into contact with the catalyst that is tethered a certain length away from the CatCapsules. Contact between the self-healing agent(s) and the catalyst facilitates homogeneous polymerization. The healing polymer 503 is the product of this homogeneous polymerization. The synthesis of the healing polymer in the crack may seal the crack.

In an embodiment, the CatCapsule of the self-healing composite material 501 referred to in FIG. 5, which may comprise a catalyst-modified microcapsule with orthogonally-bound silica support, and wherein the microcapsule contains self-healing agents and optionally a solvent. Alternately, in an embodiment, the CatCapsule may be a self-healing composite material 501 comprising i) a first microcapsule having orthogonal functionality encapsulating a catalyst and optionally a solvent; separately encapsulated from ii) a second microcapsule with orthogonal functionality encapsulating self-healing agents and optionally a solvent. In this embodiment, the first microcapsule is covalently bonded, optionally through a linking group, to the second microcapsule. The self-healing agents may be any agent described herein. The catalyst may be any metathesis catalyst described herein.

In an embodiment, the self-healing composite material comprises a CatCapsule, and a base polymer including polylactic acid, polyurethane, epoxies, polycarbonates, bio-based polymers, polyethylene terephthalate, fluoropolymers, polyvinyl chlorides, polyolefins, polysulfones, silicone, polyethylenimine, polyacrylates, polyimides, polyamides, other polyesters, and other polyethers. To use these resins, the healing chemistry should be compatible with the base polymer so that the resin can be healed. For example, if the base polymer is a polyurethane, the self-healing agent should comprise diol monomers and diisocyanate monomers. One skilled in the art will know what self-healing agents (or monomers) are needed to heal the various polymer resins.

According to another embodiment, a method for synthesizing a healing polymer in a self-healing composite material comprising a base polymer (as described herein), comprises a CatCapsule dispersed in a base polymer and optionally a solvent, and rupturing the CatCapsules. The method may further comprise rupturing the CatCapsules to release the self-healing agent monomers and bring the released monomers in contact with a catalyst, and wherein the released self-healing agent monomer is polymerized. The CatCapsules may be made according to any embodiment herein. Self-healing agents may be any agent described herein. The catalyst may be any metathesis catalyst described herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing is directed to embodiments of the present disclosure, other and further embodiments of the disclosure may be devised without departing from the basic scope thereof, and the scope thereof is determined by the claims that follow.

What is claimed is:

1. A method of making a linked microcapsule, comprising:
   providing a first microcapsule having a first payload agent inside the first microcapsule and a first orthogonal-functionalized unit incorporated into a wall of the first microcapsule;
   providing a second microcapsule having a second payload agent inside the second microcapsule and a second orthogonal-functionalized unit incorporated into a wall of the second microcapsule; and
   forming a linked microcapsule by reacting:
   (a) the first microcapsule with the second microcapsule in an acyclic diene metathesis reaction,
   (b) the first microcapsule with the second microcapsule in a thiol-ene click reaction,
   (c) the first microcapsule with the second microcapsule in a thiol-yne click reaction,
   (d) the first microcapsule with the second microcapsule in a thiol-epoxy click reaction,
   (e) the first microcapsule with the second microcapsule in a Michael reaction, or
   (f) a mixture of an isocyanate, the first microcapsule, and the second microcapsule.

2. The method of claim 1, wherein the first payload agent comprises a catalyst, and wherein the second payload agent comprises a monomer.

3. The method of claim 2, wherein the monomer is selected from the group consisting of a ring-opening metathesis monomer, a cross-metathesis monomer, an acyclic diene metathesis monomer, an acrylate metathesis monomer, and combinations thereof.

4. The method of claim 3, wherein the ring-opening metathesis monomer comprises a cyclic olefin,
the cross-metathesis monomer is selected from the group consisting of an acyclic diene, an unsaturated ester, a derivative of the unsaturated ester, and combinations thereof,
the acylic diene metathesis monomer comprises an acyclic diene, and
the acrylate metathesis monomer is selected from the group consisting of alpha, beta-unsaturated esters, a derivative of the alpha, beta-unsaturated ester, and combinations thereof.

5. The method of claim 2, wherein the catalyst is selected from the group consisting of a ring-opening metathesis polymerization catalyst, a cross-metathesis catalyst, an acyclic diene metathesis catalyst, and an acrylate metathesis catalyst.

6. The method of claim 2, wherein the wall of the first microcapsule or the second microcapsule is formed from a reaction mixture comprising:
an orthogonal-functionalized small molecule,
a cross-linking agent
$NH_4Cl$,
a copolymer, and
a solvent.

7. The method of claim 6, wherein the orthogonal-functionalized small molecule is a monoether of a triol.

8. The method of claim 6, wherein the cross-linking agent is selected from the group consisting of formaldehyde, glutaraldehyde, di-acid chloride, and derivatives thereof.

9. The method of claim 6, wherein the copolymer is selected from the group consisting of ethylene maleic anhydride, whey protein isolate, sodium caseinate, a surfactant, and derivatives thereof.

10. A method of making a linked microcapsule, comprising:
providing a first microcapsule having a first payload agent inside the first microcapsule and a first orthogonal-functionalized unit incorporated into a wall of the first microcapsule;
providing a second microcapsule having a second payload agent inside the second microcapsule and a second orthogonal-functionalized unit incorporated into a wall of the second microcapsule, wherein the wall of the first microcapsule or the second microcapsule is formed from a reaction mixture comprising: an orthogonal-functionalized small molecule, a cross-linking agent, $NH_4Cl$, a copolymer, and a solvent; and
forming a linked microcapsule by reacting:
(a) the first microcapsule with the second microcapsule in an acyclic diene metathesis reaction,
(b) the first microcapsule with the second microcapsule in a thiol-ene click reaction,
(c) the first microcapsule with the second microcapsule in a thiol-yne click reaction,
(d) the first microcapsule with the second microcapsule in a thiol-epoxy click reaction,
(e) the first microcapsule with the second microcapsule in a Michael reaction, or
(f) a mixture of an isocyanate, the first microcapsule, and the second microcapsule.

11. The method of claim 10, wherein the first payload agent comprises a catalyst, and wherein the second payload agent comprises a monomer.

12. The method of claim 11, wherein the monomer is selected from the group consisting of a ring-opening metathesis monomer, a cross-metathesis monomer, an acyclic diene metathesis monomer, an acrylate metathesis monomer, and combinations thereof.

13. The method of claim 12, wherein the ring-opening metathesis monomer comprises a cyclic olefin,
the cross-metathesis monomer is selected from the group consisting of an acyclic diene, an unsaturated ester, a derivative of the unsaturated ester, and combinations thereof,
the acyclic diene metathesis monomer comprises an acyclic diene, and
the acrylate metathesis monomer is selected from the group consisting of alpha, beta-unsaturated esters, a derivative of the alpha, beta-unsaturated ester, and combinations thereof.

14. The method of claim 11, wherein the catalyst is selected from the group consisting of a ring-opening metathesis polymerization catalyst, a cross-metathesis catalyst, an acyclic diene metathesis catalyst, and an acrylate metathesis catalyst.

15. The method of claim 10, wherein the orthogonal-functionalized small molecule is a monoether of a triol.

16. The method of claim 10, wherein the cross-linking agent is selected from the group consisting of formaldehyde, glutaraldehyde, di-acid chloride, and derivatives thereof.

17. The method of claim 10, wherein the copolymer is selected from the group consisting of ethylene maleic anhydride, whey protein isolate, sodium caseinate, a surfactant, and derivatives thereof.

18. A method of making a linked microcapsule, comprising:
providing a first microcapsule having at least a catalyst inside the first microcapsule, and a first orthogonal-functionalized unit incorporated into a wall of the first microcapsule;
providing a second microcapsule having at least a monomer inside the second microcapsule, and a second orthogonal-functionalized unit incorporated into a wall of the second microcapsule, and
forming a linked microcapsule by reacting:
(a) the first microcapsule with the second microcapsule in an acyclic diene metathesis reaction,
(b) the first microcapsule with the second microcapsule in a thiol-ene click reaction,
(c) the first microcapsule with the second microcapsule in a thiol-yne click reaction,
(d) the first microcapsule with the second microcapsule in a thiol-epoxy click reaction,
(e) the first microcapsule with the second microcapsule in a Michael reaction, or
(f) a mixture of an isocyanate, the first microcapsule, and the second microcapsule.

19. The method of claim 18, wherein
the monomer is selected from the group consisting of a cyclic olefin, an acyclic diene, an unsaturated ester, a derivative of the unsaturated ester, an acyclic diene, alpha, beta-unsaturated ester, a derivative of the alpha, beta-unsaturated ester, and combinations thereof; and
the catalyst is selected from the group consisting of a ring-opening metathesis polymerization catalyst, a cross-metathesis catalyst, an acyclic diene metathesis catalyst, and an acrylate metathesis catalyst.

20. The method of claim 18, wherein:
the first orthogonal-functionalized unit is derive from an orthogonal-functionalized small molecule, the orthogonal-functionalized small molecule being a monoether of a triol.

* * * * *